(12) United States Patent
Fukui et al.

(10) Patent No.: US 8,377,539 B2
(45) Date of Patent: Feb. 19, 2013

(54) MEMBER WITH SKIN

(75) Inventors: Naoyuki Fukui, Aichi-ken (JP);
Kimitoshi Imura, Aichi-ken (JP);
Yasuhiro Sakakibara, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 242 days.

(21) Appl. No.: 12/923,396

(22) Filed: Sep. 20, 2010

(65) Prior Publication Data
US 2011/0076444 A1 Mar. 31, 2011

(30) Foreign Application Priority Data

Sep. 28, 2009 (JP) ................................ 2009-222343

(51) Int. Cl.
*B32B 3/04* (2006.01)
(52) U.S. Cl. ......... 428/102; 428/122; 428/124; 428/125
(58) Field of Classification Search .................. 428/102, 428/122, 124, 125; 296/146.7; 112/421–425
See application file for complete search history.

(56) References Cited

FOREIGN PATENT DOCUMENTS

| JP | A-11-334364 | 12/1999 |
| JP | A-2008-94126 | 4/2008 |
| JP | A-2008-100453 | 5/2008 |

OTHER PUBLICATIONS

Office Action dated Dec. 14, 2011 in corresponding JP Application No. 2009-222343 (and English translation).

*Primary Examiner* — Alexander Thomas
(74) *Attorney, Agent, or Firm* — Posz Law Group, PLC

(57) ABSTRACT

A member with skin includes a substrate, and a skin. The substrate includes a body, and a core. The skin includes a first skin segment, and a second skin segment. The body and core make a rear side-face section, which is disposed beneath a rear face of the core, within a side face in the substrate. The member further includes a stitching allowance, which is disposed to face the rear side-face section in the substrate, between the first skin segment and the second skin segment. The first skin segment covers a front face of the body, and a front face of the core. The second skin segment covers a rear face of the body. The member further includes ornamental stitches that are disposed at a boundary between a part of the first skin segment covering the body and another part of the first skin segment covering the core.

9 Claims, 4 Drawing Sheets

MEMBER WITH SKIN

INCORPORATION BY REFERENCE

The present invention is based on Japanese Patent Application No. 2009-222,343, filed on Sep. 28, 2009, the entire contents of which are incorporated herein by reference.

BACKGROUND OF THE INVENTION

1. Field of the Invention

The present invention relates to a member with skin that comprises a substrate, and a skin covering the substrate.

2. Description of the Related Art

Many members with skin have been known heretofore, members which comprise a substrate, and a skin that covers the substrate. For example, Japanese Unexamined Patent Publication (KOKAI) Gazette No. 2008-94,126, and Japanese Unexamined Patent Publication (KOKAI) Gazette No. 2008-100,453 disclose some of conventional members with skin, respectively. FIG. 6 is an enlarged perspective view for illustrating a major part of one of the conventional members with skin. FIG. 7 is a cross-sectional diagram for illustrating how the conventional member with skin being shown in FIG. 6 appears when it is cut at a position that is specified with the chain double-dashed line "7"-"7" in FIG. 6. The conventional member with skin will be hereinafter described with reference to FIGS. 6 and 7.

For example, the one of the conventional members with skin comprises a substrate 101, and a skin 105, as shown in FIGS. 6 and 7. As illustrated in FIG. 7, the skin 105 is made by stitching two skin sheets 106 and 107 together; and the skin sheets 106 and 107 are disposed so as to face the front opposite faces face-to-face inwardly, as shown in the drawing. Moreover, as illustrated in the drawing and FIG. 6, stitches 200 between the skin sheets 106 and 107 are exposed over one of the side faces of the substrate 101. More specifically, in the conventional member with skin that is shown in FIGS. 6 and 7, the skin sheet 105 has a rear face 105$b$ that is disposed to face and then cover the substrate 101. In addition, the conventional member with skin is provided with the stitches 200 that are exposed between the skin sheets 105 and 106 over one of the side faces of the substrate 101. Thus, the conventional member with skin displays a predetermined decoration on the peripheral end.

In such a conventional member with skin, a stitching allowance 150 between the skin sheets 106 and 107 is put in place behind the rear opposite face 105$b$ of the skin 105 to face one of the side faces of the substrate 101. The "stitching allowance" herein designates an allowance for stitching the skin sheets 106 and 107 together, that is, a part of the skin sheet 106 and a part of the other skin sheet 107 that are present on the outer side with respect to the resulting stitches 200 before stitching the skin sheets 106 and 107 together. Accordingly, the skin 105 has floated above or separated from the substrate 101 by a thickness of the stitching allowance 150 at around the part that is adjacent to the stitches 200. The part that floats above the substrate 101 will be hereinafter referred to as a "peripheral-end skin portion 160." If the peripheral-end skin portion 160 should have floated above the substrate 101 in varying floating magnitudes, the peripheral-end skin portion 160 degrades the decorativeness in the conventional member with skin. In general, however, the peripheral-end skin portion 160 has been controlled over the floating height "L3" and floating width "L4" from the substrate 101 in the following manner: the peripheral-end skin portion 160 and stitching allowance 150 are fastened together by stitching (namely, sewing or carrying out a French seam) so that the peripheral-end skin portion 160 wraps around the stitching allowance 150, as illustrated in FIG. 7. Moreover, the peripheral-end skin portion 160 that has undergone a French seam can give the conventional member with skin a bead-like (or pipe-shaped) decoration.

Incidentally, the peripheral-end skin portion 160 generally makes a three-dimensional configuration in the conventional member with skin. Accordingly, the peripheral-end skin portion 160 is sewed together as it is folded and bent in a relatively complicated form. Consequently, when subjecting the conventional member with skin to a French seam to make the peripheral-end skin portion 160, twists, undulations, or wrinkles might occur in the resulting peripheral-end skin portion 160, as shown in FIG. 6. If twists, undulations, or wrinkles should have arisen in the peripheral-end skin portion 160, the resultant conventional member with skin would have deteriorated in the decorativeness. Moreover, it is a tiresome and difficult operation for an assembly worker or robot to cover the substrate 101 with the skin 105 while positioning the peripheral-end skin portion 160 highly accurately with respect to the substrate 101. In addition, the decorativeness of the conventional member with skin might be impaired by the peripheral-end skin portion 160 that should have been displaced with respect to the substrate 101.

SUMMARY OF THE INVENTION

The present invention has been developed in view of the aforementioned circumstances. It is therefore an object of the present invention to provide a member with skin that exhibits better decorativeness.

A member with skin according to the present invention can solve the above-described problems, and comprises:

a substrate; and a skin covering the substrate;

the substrate comprising a body having a front face, a rear face and a side face, and a core having a front face and a rear face and protruding from the side face of the body toward the outside to the body;

the skin comprising a first skin segment having a front opposite face and a rear opposite face, and a second skin segment having a front opposite face and a rear opposite face, the first skin segment and second skin segment being stitched together so as to dispose their front opposite faces face-to-face inwardly at one of the opposite ends;

the body and core making a rear side-face section within the side face in the substrate, the rear side-face section being disposed beneath the rear face of the core;

the member further comprising a stitching allowance between the first skin segment of the skin and the second skin segment thereof, the stitching allowance being disposed to face the rear side-face section in the substrate;

the first skin segment of the skin covering not only the front face of the body in the substrate but also the front face of the core therein;

the second skin segment of the skin covering the rear face of the body in the substrate; and the member further comprising ornamental stitches being disposed at a boundary between a part of the first skin segment covering the body of the substrate and another part of the first skin segment covering the core of the substrate.

The member with skin according to the present invention can preferably be provided with either one of the following optional features, (1) or (2). It is more preferable that the present member with skin can be provided with both of the two optional features, (1) and (2).

(1) In the member with skin according to the present invention, it is preferable that the member can further comprise a secondary core being made independently of the substrate, being harder than the skin is, and being disposed nearer to the rear face of the body in the substrate than the rear face of the core therein is disposed; and that the second skin segment of the skin can further cover the secondary core.

(2) In the member with skin according to the present invention, it is preferable that the substrate can comprise the body and core that are disposed successively stepwise at the rear side-face section.

The member with skin according to the present invention can display such a decoration (namely, a bead-like decoration) as if the first skin segment and second skin segment have undergone a French seam, without ever subjecting the first skin segment and second skin segment to the French seam actually. The advantageous effect results from the following settings: the core, which is disposed on the side face of the body in the substrate to protrude from the side face, is covered with a part of the first skin segment that is put in place adjacent to the resulting stitches within the first skin segment; and the first skin segment is provided with the resultant ornamental stitches.

Moreover, twists, undulations, or wrinkles are less likely to occur in the resulting peripheral-end skin portion of the member with skin according to the present invention, because the first skin segment and second skin segment are in fact not subjected to any French seam at all.

In addition, it is possible to give the peripheral-end skin portion such a configuration that conforms to the core, because the core is put in place inside the resulting peripheral-end skin portion, that is, inside the first skin segment in the resulting peripheral-end skin portion, more specifically. Thus, the setting also makes it possible to give the member with skin according to the present invention a bead-like decoration while inhibiting twists, undulations, or wrinkles from occurring in the resultant peripheral-end skin portion.

Moreover, the core, and the stitching allowance between the first skin segment and the second skin segment enable an assembly worker or robot to carry out the positioning between the skin and the substrate reliably, because the stitching allowance is put in place at such a position that faces the rear side-face section within the substrate as a whole, that is, the stitching allowance is located beneath the rear face of the core, more specifically. Thus, the member with skin according to the present invention is good in terms of decorativeness.

The member with skin according to the present invention that is provided with above-described optional feature (1) comprises the secondary core that is put in place inside the second skin segment in the resultant peripheral-end skin portion. In the thus constructed present member with skin, it is possible for a front-side part (namely, a part in which the first skin segment is exposed) and a rear-side part (namely, another part in which the second skin segment is exposed) in the resulting peripheral-end skin portion to exhibit a thickness that is approximately equal to each other. Consequently, above-described optional feature (1) enables the present member with skin to display much better decorativeness.

The member with skin according to the present invention that is provided with above-described optional feature (2) comprises the rear-side face section that makes the substrate's body and core extend continuously stepwise within the side face in the substrate as a whole. Accordingly, the core, the stitching allowance, and the rear-side face section make it possible for an assembly worker or robot to position the skin with respect to the substrate more accurately. Consequently, the present member with skin that is constructed in accordance with above-described optional feature (2) can display much better decorativeness.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

It is possible to use a member with skin according to the present invention as members that display bead-like decorations on the peripheral end. For example, it is preferable to employ the present member with skin in some of interior component parts, such as meter hoods and center consoles, for automobile.

In the member with skin according to the present invention, it is allowable that the body of the substrate can only have a front face, a rear face, and a side face. For example, the body can be formed as a plate shape, such as flat-plate shapes and curved-plate shapes, or can be formed as the other configurations, such as box shapes and columnar shapes. As far as the core of the substrate can be disposed on the side face of the body in the substrate and can protrude outward toward the outside to the body, it does not matter at all that the core can have any configurations. For instance, it is permissible that the body of the substrate can be provided with the core successively over the entire periphery, or can be provided with the core partially in a part of the periphery alone. Moreover, it is allowable that a plurality of the cores can be disposed dispersedly in the circumferential direction of the body.

In the member with skin according to the present invention, it is allowable that the skin can comprise two skin segments, namely a first skin segment and a second skin segment. Moreover, it is even permissible that the skin can comprise three or more skin segments, namely, a first skin segment, a second skin segment and a third skin segment, and so on. In addition, it does not matter at all that the skin can be any types of skins. Moreover, it is also allowable that the skin can be fastened to the substrate by any methods, such as bonding, tacking or riveting and welding.

EXAMPLES

Hereinafter, some of members with skin according to specific examples of the present invention will be described with reference to the accompanying drawings.

Example No. 1

Figure 1:
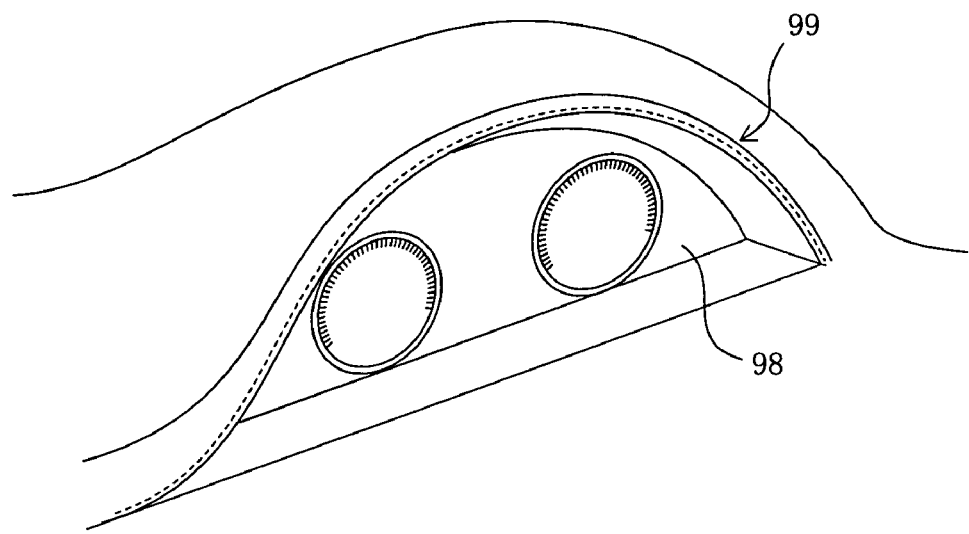
FIG. 1 is a perspective diagram for illustrating how a member with skin according to Example No. 1 of the present invention appears when it is disposed in vehicle.
Figure 2:
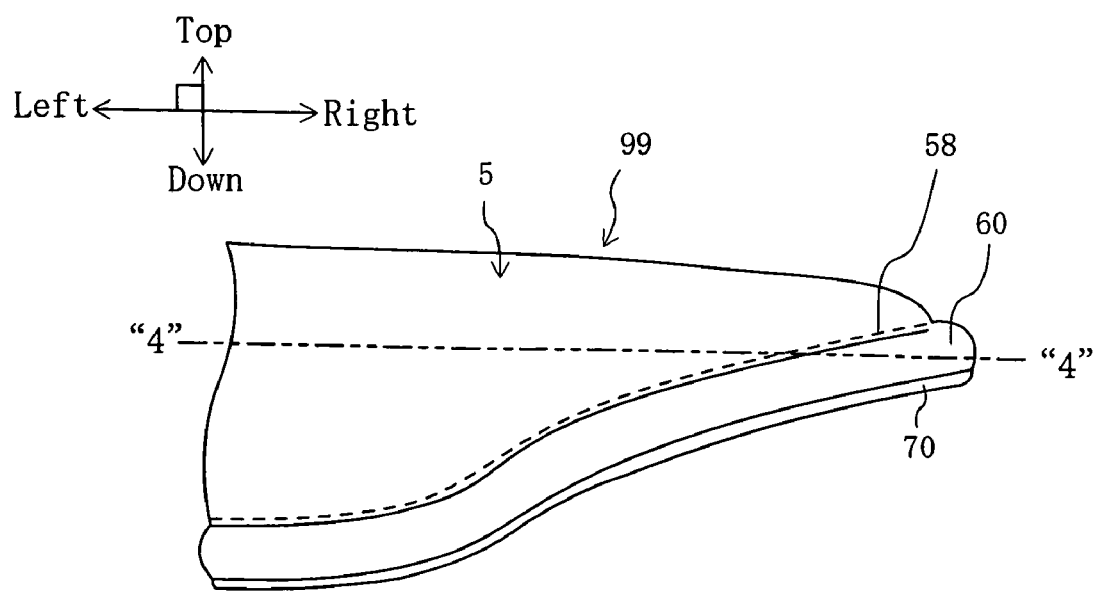
FIG. 2 is an enlarged perspective diagram for schematically illustrating a major part of the present member with skin according to Example No. 1.
Figure 3:
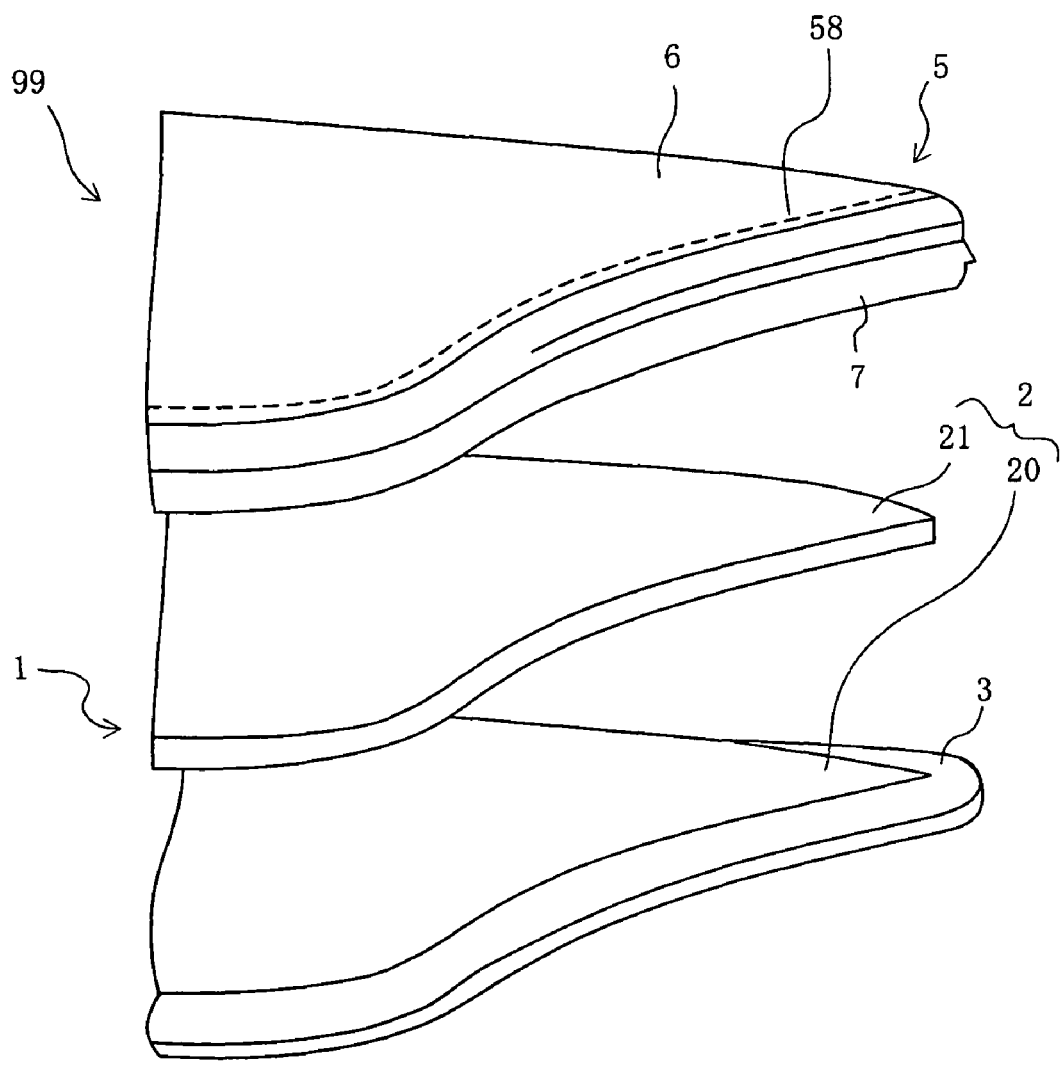
FIG. 3 is an enlarged exploded perspective diagram for schematically illustrating a major part of the present member with skin according to Example No. 1.
Figure 4:
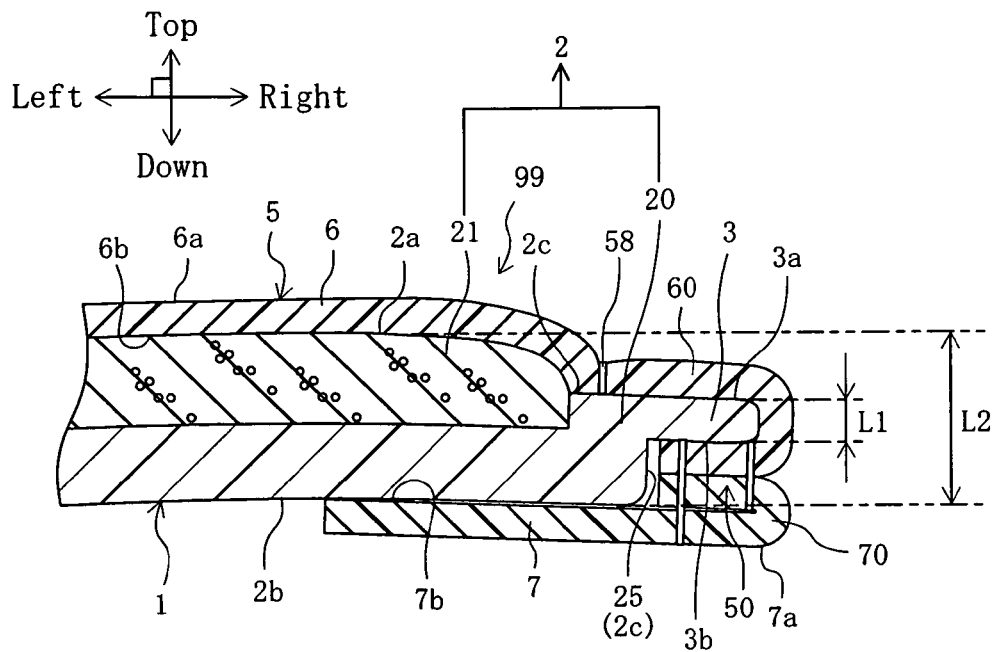
FIG. 4 is a cross-sectional diagram for schematically illustrating how the present member with skin according to Example No. 1 appears when it is cut at a position that is designated with the "4"-"4" chain double-dashed line in FIG. 2.

A member with skin according to Example No. 1 of the present invention makes a meter hood, one of interior component parts for automobile. FIGS. 1 through 4 show explanatory diagrams for illustrating the present member with skin according to Example No. 1. Specifically, FIG. 1 schematically illustrates how the present member with skin according to Example No. 1 appears when it is disposed in vehicle in a perspective diagram. FIG. 2 schematically illustrates a major part of the present member with skin according to Example No. 1 in an enlarged perspective diagram. FIG. 3 schematically illustrates another major part of the present member with skin according to Example No. 1 in an enlarged exploded perspective diagram. FIG. 4 schematically illustrates how the present member with skin according to Example No. 1 appears in a cross-sectional diagram. Note that FIG. 4 shows a cross section of the present member with skin according to Example No. 1 when it is cut at a position that is designated with the "4"-"4" chain double-dashed line in FIG. 2. Unless otherwise specified, the directions, "top," "down," "right" and "left," will hereinafter specify the "top," "down," "right" and "left" designations given in FIG. 2. A front face of a body designates a face that is put in place on the top side in FIG. 2, and a rear face of the body designates another side that is put in place on the down side in FIG. 2. Moreover, a side face of the body is a side that connects the front face with the rear face, and designates a still another side that is put in place on the right side in FIG. 2.

As illustrated in FIG. 1, a member 99 with skin according to Example No. 1 of the present invention is used as a meter hood that is disposed in a passenger room of automobile. Moreover, the meter hood covers a meter panel 98 in an overhanging manner, that is, like the eaves of roof.

As shown in FIG. 3, the present member 99 with skin according to Example No. 1 comprises a substrate 1, and a skin 5. The substrate 1 comprises a body 2, and a core 3 (see FIG. 4). The body 2 is formed as a plate shape substantially. The core 3 protrudes from one of the side faces of the body 2 toward the outside to the body 2. The body 2 comprises a base 20, and a cushion 21. The base 20 is made of a mixture of synthetic resins (namely, polycarbonate (or PC) and acrylonitrile-butadiene-styrene (or ABS) copolymer). The cushion is made of polyurethane foam. The cushion 21 is molded independently of the base 20, and is then bonded on the front face (or top face) of the base 20.

The core 3 is made of the same mixture of synthetic resins as that of the body 2. As illustrated in FIG. 4, the core 3 is molded integrally with the base 20. The core 3 makes a flange shape that protrudes from one of the side faces of the base 20 toward the outer side to the base 20. Moreover, as shown in the drawing, the core 3 has a wall thickness "L1" that is thinner than a thickness "L2" that the body 2 has. The wall thickness "L1" herein means a distance or dimension between a face, which is put in place on the front-face side of the substrate 1 within the protruding core 3 proper, and another face, which is put in place on the rear-face side of the substrate 1 within the protruding core 3 proper, that is, a thickness in the top/down direction in FIG. 2, or in FIG. 4; whereas the wall thickness "L2" herein means a distance or dimension between the front and rear faces of the body 2 that the base 20 and cushion 21 make as a whole. Accordingly, in the substrate 1 as a whole, the core 3 has a front face (or a top face) that is disposed lower than that of the entire body 2 is. That is, the front face 3a (namely, the top face) of the core 3 is disposed nearer to the rear face 2b (namely, the bottom face) of the whole body 2 than the front face 2a (namely, the top face) of the whole body 2 is. In addition, in the substrate 1 as a whole, the core 3 has a rear face (or a bottom face) that is disposed higher than that of the entire body 2 is. That is, the rear face 3b (namely, the bottom face) of the core 3 is disposed nearer to the front face 2a (namely, the top face) of the whole body 2 than the rear face 2b (namely, the bottom face) of the whole body 2 is. Consequently, the substrate 1 is provided with a step or shoulder between the front face 2a of the body 2 and the front face 3a of the core 3, and is further provided with another step or shoulder between the rear face 2b of the body 2 and the rear face 3b of the core 3. Moreover, the body 2 has a side face 2c. Note that the body 2 and core 3 make the side face 2c as a whole in the substrate 1. The side face 2c is provided with a section that is put in place nearer to the rear face 2b of the body 2 than the protruding core 3 proper is. The section will be hereinafter referred to as a "rear side-face section" 25. Note that the rear-side section 25, and the protruding core 3 proper are disposed successively stepwise.

The skin 5 comprises a first skin spread 6, and a second skin spread 7. The first skin spread 6, and second skin spread 7 are made of hide or leather. The first skin spread 6, and the second skin spread 7 are superimposed outside in, that is, in such a state that the front opposite face 6a of the first skin spread 6 and the front opposite face 7a of the second skin spread 7 face each other inwardly at one of the opposite ends, as shown in FIG. 4; and are then stitched together. As illustrated in FIG. 4, the stitching allowance 50 between the first skin spread 6 and the second skin spread 7 is disposed on the side of the rear surface 3b in the core 3, that is, behind or under the core 3. Moreover, the stitching allowance 50 faces the rear side-face section 25 that the base 2 and core 3 make as a whole in the substrate 1. The first skin spread 6 is bent around starting at the origin, which the stitching allowance 50 makes, in such a direction that the rear opposite face 6b is directed to the substrate 1. The first skin spread 6 covers the core 3, and the front face 2a of the body 2. The first skin spread 6 is bonded onto the substrate 1 at the rear opposite face 6b. The first skin spread 6 is provided with ornamental stitches 58. The ornamental stitches 58 are disposed at around the boundary between a section that covers the core 3 and another section that covers the body 2 within the first skin spread 6. Note that the section that covers the core 3 will be hereinafter referred to as a "first peripheral-end skin portion 60." Moreover, the ornamental stitches 58 make a decorative seam that is formed in the first skin spread 6 alone.

In the same manner as the first skin spread 6, the second skin spread 7 is bent around starting at the origin, which the stitching allowance 50 makes, in such a direction that the rear opposite face 7b is directed to the substrate 1. The second skin spread 7 covers the rear face 2b of the body 2. The second skin spread 7 is bonded onto the substrate 1 at the rear opposite face 7b. Within the second skin spread 7, a section that is located on the rear side of the core 3 (or beneath or below the core 3) protrudes outward (i.e., in the right direction in FIG. 4) while keeping the folded state at the inner end. Note that the section that is located beneath or below the core 3 will be hereinafter referred to as a "second peripheral-end skin portion 70." Moreover, the second peripheral-end skin portion 70 is folded to produce a horizontal protrusion dimension, which is virtually equal to that of the first peripheral-end skin portion 60, in the right/left direction in FIG. 4. In addition, within the second skin spread 7, the section other than the second peripheral-end skin portion 70 covers a section that is located adjacent to the side face 2c within the rear face 2b, which the base 20 and cushion 21 make as a whole in the body 2.

As illustrated in FIG. 2, the present member 99 with skin according to Example No. 1 comprises the first skin spread 6 that is provided with ornamental stitches 58, and which covers the core 3 in the substrate 1 as shown in FIG. 4. Accordingly, the present member 99 with skin according to Example No. 1 comprises a peripheral-end skin portion that displays a bead-like decoration. Specifically, the peripheral-end skin portion comprises the first peripheral-end skin portion 60, and the second peripheral-end skin portion 70 as described above. In actuality, however, the first skin spread 6, and the second skin spread 7 are not fastened together by any French seam at all. Consequently, the first peripheral-end skin portion 60, and the second peripheral-end skin portion 70 are less likely to suffer from twisting, undulations, or wrinkles.

Moreover, the present member 99 with skin according to Example No. 1 comprises the substrate 1 that is provided with the core 3. The core 3 is involved or enveloped inside the first peripheral-end skin portion 60 and second peripheral-end skin portion 70, especially inside the first peripheral-end skin portion 60, at the section that is likely to be visible to users. To put it differently, the first peripheral-end skin portion 60 is backed up or lined with the core 3. Accordingly, twisting, undulations, or wrinkles are less likely to occur in the first peripheral-end skin portion 60, because the first peripheral-end skin portion 60 is shaped along the core 3. Consequently, the present member 99 with skin according to Example No. 1 exhibits better decorativeness.

In addition, the present member 99 with skin according to Example No. 1 comprises the stitching allowance 50 between the first skin spread 6 and the second skin spread 7. The stitching allowance 50 is put in place so as to face the rear side-face section 25 that the base 20 and cushion 21 make as a whole in the body 2. Specifically, as illustrated in FIG. 4, the stitching allowance 50 is disposed lower than the rear face 3b of the core 3 is. Accordingly, the stitching allowance 50 and core 3 can position the skin 5 and substrate 1 in the front/rear direction, that is, in the top/down direction in FIG. 2, highly accurately. Moreover, the base 20, and the core 3 are disposed successively stepwise at the rear side-face section 25. In addition, the end face of the stitching allowance 50 faces the rear side-face section 25 that connects between the base 20 and the core 3 successively stepwise. Consequently, the stitching allowance 50 and rear side-face section 25 can position the skin 5 and substrate 1 inward/outward, that is, in the right/left direction in FIG. 2, highly accurately. Therefore, the present member 99 with skin according to Example No. 1 is much better in terms of decorativeness.

Moreover, the substrate 1, especially, the body 2, is provided with the cushion 21. The cushion 21 is disposed on the base 20 in the body 2 so as to expand or swell out more forward, that is, more upward in FIG. 4, than the top face of the core 3 is in the substrate 1 that the base 20 and cushion 21 make as a whole. Accordingly, an indent or recess is formed at the boundary between the cushion 21 and the core 3. As described above, the ornamental stitches 58 are put in place at around the boundary between a section, which covers the body 2, and another section, which the first peripheral-end portion 60 makes, within the first skin spread 6 as a whole. Specifically, the ornamental stitches 58 are put in place on the front face in the first skin spread 6, front face which is located adjacent to the peripheral side-face end in the cushion 21 (namely, the right peripheral end in the cushion 21 in FIG. 4). Consequently, the ornamental stitches 58 are put in place inside the above-described indented or recessed section in the front face of the first skin spread 6. As a result, a swollen decoration is displayed by the inner section of the first skin spread 6 (namely, the left-side section of the first skin spread 6 in FIG. 4) that is present on a more central side than the ornamental stitches 58 are. Therefore, the ornamental stitches 58 appear as if they penetrate through the first peripheral-end skin portion 60 and second peripheral-end skin portion 70. The resulting visual effect also gives the present member 99 with skin according to Example No. 1 an appearance as if the peripheral-end skin portion makes a bead-shaped ornament.

Example No. 2

Figure 5:
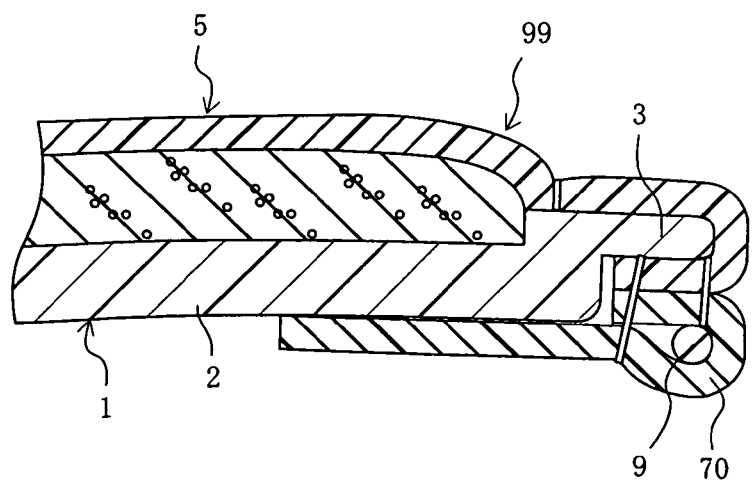
FIG. 5 is a cross-sectional diagram for schematically illustrating how a member with skin according to Example No. 2 of the present invention appears when it is cut at the same position as that is designated with the "4"-"4" chain double-dashed line in FIG. 2.
Figure 6:
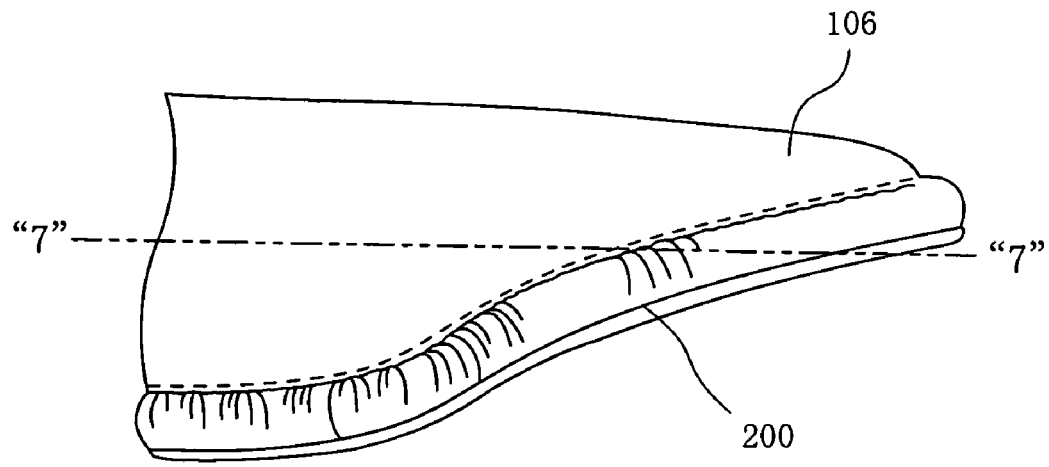
FIG. 6 is an enlarged perspective diagram for schematically illustrating a major part of a conventional member with skin.
Figure 7:
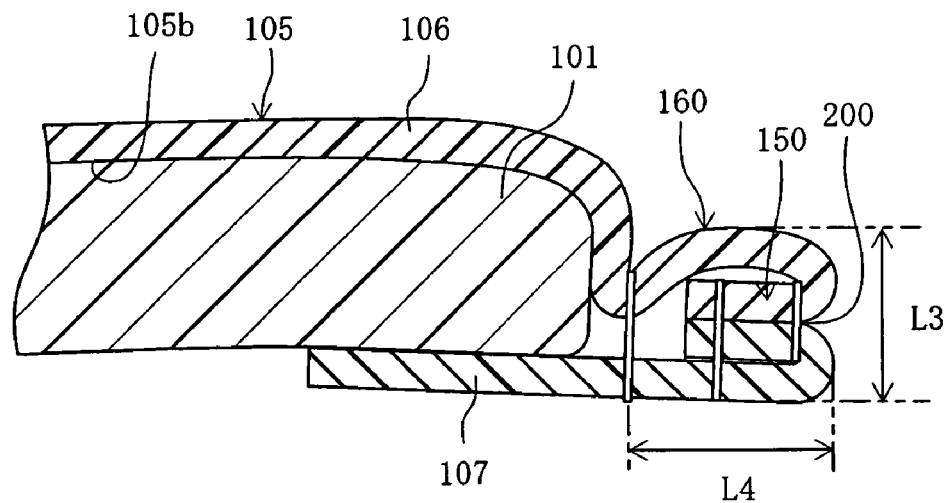
FIG. 7 is a cross-sectional diagram for schematically illustrating how the conventional member with skin appears when it is cut at a position that is designated with the "7"-"7" chain double-dashed line in FIG. 6.

A member with skin according to Example No. 2 of the present invention is identical with the present member 99 with skin according to Example No. 1 other than the following settings: it further comprises a secondary core (namely, an insert or armature) that is made independently of the substrate; and it comprises a second peripheral-end skin portion that covers the secondary core, too. In FIG. 5, the present member with skin according to Example No. 2 is illustrated schematically in a cross-sectional diagram that shows how the present member with skin appears when it is cut at the same position as that is designated with the "4"-"4" chain double-dashed line in FIG. 2.

In addition to the component elements of the present member 99 with skin according to Example No. 1, the present member 99 with skin according to Example No. 2 further comprises a secondary core 9. The secondary core 9 is made of polypropylene (or PP), and is formed as a cylindrical shape substantially. In the same manner as the core 3, the secondary core 9 extends along the circumferential direction of the substrate 1, especially, along that of the body 2 in the substrate 1. The secondary core 9 is put in place on the rear-face side of the core 3 (namely, down below the core 3). That is, the secondary core 9 is located beneath the rear face 3b of the core 3. Moreover, the secondary core 9 is separated from the core 3 in the front/rear direction (namely, in the top/down direction in FIG. 5). The second skin spread 7 comprises a second peripheral-end skin portion 70 that covers the secondary core 9 as well. In other words, the second peripheral-end skin portion 70 is rolled around the secondary core 9, and is backed up or lined with the secondary core 9.

The present member 99 with skin according to Example No. 2 can comprise the first peripheral-end skin portion 60 and second peripheral-end skin portion 70 having a thickness that is equal to each other substantially. Accordingly, it is possible for the present member 99 with skin according to Example No. 2 to display two bead-shaped ornaments in the front face of the first peripheral-end skin portion 60 and the rear face of the second peripheral-end skin portion 70, respectively. The two bead-shaped ornaments look as if they are lined up. Moreover, in the same manner as the present member 99 with skin according to Example No. 1, the present member 99 with skin according to Example No. 2 enables an assembly worker or robot not only to reduce the occurrence of twisting, undulations, or wrinkles in the manufacture, but also to position the skin 5 with respect to the substrate 1 highly accurately in the manufacture. Consequently, the present member 99 with skin according to Example No. 2 produces better decorativeness as well.

Having now fully described the present invention, it will be apparent to one of ordinary skill in the art that many changes and modifications can be made thereto without departing from the spirit or scope of the present invention as set forth herein including the appended claims.

What is claimed is:

1. A member with skin, the member comprising;
a substrate; and
a skin covering the substrate;
the substrate comprising a body having a front face, a rear face, and a side face, and a core having a front face and a rear face and protruding from the side face of the body toward the outside to the body;
the skin comprising a first skin segment having a front opposite face and a rear opposite face, and a second skin segment having a front opposite face and a rear opposite face, the first skin segment and second skin segment being stitched together so as to dispose their front opposite faces face-to-face inwardly at one of the opposite ends;
the body and core making a rear side-face section within the side face in the substrate, the rear side-face section being disposed beneath the rear face of the core;
the member further comprising a stitching allowance between the first skin segment of the skin and the second skin segment thereof, the stitching allowance being disposed to face the rear side-face section in the substrate;
the first skin segment of the skin covering not only the front face of the body in the substrate but also the front face of the core therein;
the second skin segment of the skin covering the rear face of the body in the substrate; and
the member further comprising ornamental stitches being disposed at a boundary between a part of the first skin segment covering the body of the substrate and another part of the first skin segment covering the core of the substrate.

2. The member according to claim 1, wherein:
the member further comprises a secondary core being made independently of the substrate being harder than the skin is, and being disposed nearer to the rear face of the body in the substrate than the rear face of the core therein is disposed; and
the second skin segment of the skin further covers the secondary core.

3. The member according to claim 1, wherein
the substrate comprises the body and core that are disposed successively stepwise at the rear side-face section.

4. The member according to claim 3, wherein
the rear side-face section connects the rear face of the body with the rear face of the core successively stepwise.

5. The member according to claim 1, wherein:
the body of the substrate is provided with an indentation in the central part;
the substrate further comprises a cushion having a front face and a rear face, the front face protruding beyond the front face of the core in the substrate, the rear face being buried in the indentation of the body in the substrate; and
the first skin segment covers the front face of the cushion in the substrate.

6. A member with skin, the member comprising:
a substrate; and
a skin covering the substrate;
the substrate comprising a body having a front face and a rear face, and a flange having a front face and a rear face and protruding from the body radially outward;
the skin comprising a first skin segment having a front opposite face and a rear opposite face, and a second skin segment having a front opposite face and a rear opposite face, the first skin segment and second skin segment being stitched together so as to dispose their front opposite faces face to face inwardly;
the member further comprising a stitching allowance between the first skin segment of the skin and the second skin segment thereof, the stitching allowance being disposed behind the rear face of the flange in the substrate;
the first skin segment of the skin covering not only the front face of the body in the substrate but also the front face of the flange in the substrate;
the second skin segment of the skin covering the rear face of the body in the substrate; and
the member further comprising ornamental stitches disposed at a boundary between a part of the first skin segment covering the body of the substrate and another part of the first skin segment covering the flange.

7. The member according to claim 6, wherein:
the substrate is formed as an inverted hat shape that makes the body being provided with an indentation in the central part and the flange protruding from the front face of the body radially outward; and
the substrate further comprises a cushion having a front face and a rear face, the front face protruding beyond the front face of the flange in the substrate, the rear face being buried in the indentation of the body in the substrate; and
the first skin segment covers the front face of the cushion in the substrate.

8. The member according to claim 6, wherein:
the member further comprises an insert being made independently of the substrate, being harder than the skin is, and being disposed behind the stitching allowance; and
the second skin segment of the skin further covers the insert.

9. The member according to claim 6, wherein:
the body and flange make a rear side-face section within the side face in the substrate and the rear side-face section is disposed beneath the rear face of the flange.

* * * * *